US011989130B2

(12) United States Patent
Lu

(10) Patent No.: US 11,989,130 B2
(45) Date of Patent: May 21, 2024

(54) DEVICE FOR PACKET PROCESSING ACCELERATION

(71) Applicant: REALTEK SEMICONDUCTOR CORPORATION, Hsinchu (TW)

(72) Inventor: Kuo-Cheng Lu, Hsinchu (TW)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 101 days.

(21) Appl. No.: 17/972,603

(22) Filed: Oct. 25, 2022

(65) Prior Publication Data

US 2023/0169006 A1 Jun. 1, 2023

(30) Foreign Application Priority Data

Nov. 29, 2021 (TW) ................................ 110144453

(51) Int. Cl.
*G06F 12/0862* (2016.01)
*G06F 3/06* (2006.01)

(52) U.S. Cl.
CPC ........ *G06F 12/0862* (2013.01); *G06F 3/0611* (2013.01); *G06F 3/0659* (2013.01); *G06F 3/0673* (2013.01); *G06F 2212/305* (2013.01); *G06F 2212/6022* (2013.01)

(58) Field of Classification Search
CPC .. G06F 12/0862; G06F 3/0611; G06F 3/0659; G06F 3/0673; G06F 2212/305; G06F 2212/6022
See application file for complete search history.

(56) References Cited

U.S. PATENT DOCUMENTS

| 2008/0005296 | A1* | 1/2008 | Lee ........................ | H04L 49/901 709/223 |
| 2009/0210577 | A1* | 8/2009 | Lu ........................... | G06F 13/28 710/22 |
| 2015/0281109 | A1* | 10/2015 | Saxena ................. | H04L 49/901 370/412 |
| 2016/0274936 | A1* | 9/2016 | Garg ....................... | G06F 9/466 |

OTHER PUBLICATIONS

Liao, Guangdeng, Xia Znu, and Laxmi Bnuyan. "A new server I/O architecture for high speed networks." 2011 IEEE 17th International Symposium on High Performance Computer Architecture. IEEE, 2011. (Year: 2011).*

* cited by examiner

*Primary Examiner* — Nicholas J Simonetti
(74) *Attorney, Agent, or Firm* — WPAT, P.C.

(57) ABSTRACT

A device for packet processing acceleration includes a CPU, a tightly coupled memory (TCM), a buffer descriptor (BD) prefetch circuit, and a BD write back circuit. The BD prefetch circuit reads reception-end (RX) BDs from an RX BD ring of a memory to write them into an RX ring of the TCM, and reads RX header data from a buffer of the memory to write them into the RX ring. The CPU accesses the RX ring to process the RX BDs and RX header data, and generates transmission-end (TX) BDs and TX header data; afterwards, the CPU writes the TX BDs and TX header data into a TX ring of the TCM. The BD write back circuit reads the TX BDs and TX header data from the TX ring, writes the TX BDs into a TX BD ring of the memory, and writes TX header data into the buffer.

15 Claims, 8 Drawing Sheets

DEVICE FOR PACKET PROCESSING ACCELERATION

BACKGROUND OF THE INVENTION

1. Field of the Invention

The present disclosure relates to a device for packet processing, especially to a device for packet processing acceleration.

2. Description of Related Art

FIG. 1 shows a general packet processing apparatus (e.g., home gateway, WiFi access point, or 5G base station). The packet processing apparatus of FIG. 1 includes a central processing unit (CPU) 110, a cache 120, a multiplexer/demultiplexer 130, a dynamic random access memory (DRAM) 140, a first network interface controller (NIC1) 150, and a second network interface controller (NIC2) 160. The NIC1 150 is configured to store received packets in the DRAM 140 through a receiver direct memory access (RX DMA) controller (not shown in FIG. 1) of the NIC1 150. The CPU 110 is configured to access the DRAM 140 to read and process at least a part of data (e.g., buffer descriptor (BD) and packet header data) of the received packets, and then write the processed data to the DRAM 140. The NIC2 160 is configured to access the DRAM 140 through a transmitter direct memory access (TX DMA) controller (not shown in FIG. 1) of the NIC2 160, and thereby read the processed packets and treat them as to-be-transmitted packets for output.

In light of the above, the CPU 110 needs to access the DRAM 140 to obtain the at least a part of data of the received packets, and also needs to access the read and write indices of the RX DMA controller of the NIC1 150 to ascertain whether any packet in the DRAM 140 needs to be read. In order to improve the processing performance, the CPU 110 accesses packet data in a cached access manner and an uncached access manner. The uncached access manner has performance problems, and the cached access manner has cache coherency and cache pollution problems. In addition, long latency problems occur when the CPU 110 accesses the read and write indices of the RX DMA controller or the TX DMA controller.

There are several solutions to the problems of the packet processing apparatus 100 of FIG. 1. One solution replaces the DRAM 140 of FIG. 1 with a static random access memory (SRAM). However, this solution results in a high cost, and an insufficient SRAM capacity leads to the increase in a packet discard rate in some circumstance (e.g., network congestion circumstance) and affects user experience. In addition, the above-mentioned solution cannot prevent long latency problems when the read and write indices of the RX DMA controller or the TX DMA controller are accessed.

Another solution adds an input/output (I/O) coherency unit 210 to the packet processing apparatus 100 of FIG. 1 as shown in FIG. 2. The I/O coherence unit 210 can snoop the process of the NIC1 150 accessing the DRAM 140 and thereby automatically write a part of accessed data (e.g., BD and packet header data) into the cache 120 to allow the CPU 110 to achieve the purpose of the minimum latency when using the cache access manner. In addition, when the NIC2 160 is going to read processed data (e.g., BD or to-be-transmitted packets), the I/O coherency unit 210 can automatically write the processed data stored in the cache 120 to the DRAM 140 after it detects the NIC2 160's read intention so that the NIC2 160 can read the latest processed data. Although the above-mentioned solution may do well in performance, the I/O coherency unit 210 is complicated and costs too much, and it needs the network interface card's cooperation. In addition, the solution has the aforementioned cache pollution problems and cannot prevent the aforementioned long latency problems.

SUMMARY OF THE INVENTION

An object of the present disclosure is to provide a device for packet processing acceleration as an improvement over the prior art.

An embodiment of the device for packet processing acceleration of the present disclosure includes a central processing unit (CPU), a tightly coupled memory (TCM), a buffer descriptor (BD) prefetch circuit, and a BD write back circuit.

The TCM is coupled to the CPU and is a first type of memories (e.g., static random access memory, SRAM). The BD prefetch (BDP) circuit is coupled to the TCM, and configured to read multiple pieces of reception-end (RX) BD data stored in an RX BD ring according to a BD extraction map and then write the multiple pieces of RX BD data into an RX packet information ring, wherein the RX BD ring is included in a system memory (e.g., dynamic random access memory, DRAM) and the RX packet information ring is included in the TCM. The BDP circuit is further configured to read multiple pieces of RX header data stored in a packet buffer according to a buffer extraction map, and then write the multiple pieces of RX header data into the RX packet information ring, wherein the packet buffer is included in the system memory. The CPU is configured to access the RX packet information ring to read and process the multiple pieces of RX BD data and the multiple pieces of RX header data and thereby generate multiple pieces of transmission-end (TX) BD data and multiple pieces of TX header data. The CPU is further configured to write the multiple pieces of TX BD data and the multiple pieces of TX header data into a TX packet information ring, wherein the TX packet information ring is included in the TCM. The BD write back (BDW) circuit is coupled to the TCM, and configured to read the multiple pieces of TX BD data stored in the TX packet information ring and then write the multiple pieces of TX BD data into a TX BD ring, wherein the TX BD ring is included in the system memory. The BDW circuit is further configured to read the multiple pieces of TX header data stored in the TX packet information ring and then write the multiple pieces of TX header data into the packet buffer.

Another embodiment of the device for packet processing acceleration of the present disclosure includes a central processing unit (CPU) and a tightly coupled memory (TCM). The TCM is coupled to the CPU. The CPU is configured to perform a buffer descriptor prefetch (BDP) operation including: the CPU reading multiple pieces of reception-end (RX) buffer descriptor (BD) data stored in an RX BD ring according to a BD extraction map and then writing the multiple pieces of RX BD data into an RX packet information ring; and the CPU reading multiple pieces of RX header data stored in a packet buffer according to a buffer extraction map, and then writing the multiple pieces of RX header data into the RX packet information ring, wherein both the RX BD ring and the packet buffer are included in a system memory and the RX packet information ring is included in the TCM. The CPU is also configured to perform a BD processing operation including: the CPU accessing the RX packet information ring to read and process the multiple pieces of RX BD data and the multiple pieces of RX header data and thereby generating multiple pieces of transmission-end (TX) BD data and multiple pieces of TX header data; and the CPU writing the multiple pieces of TX BD data and the multiple pieces of TX header data into a TX packet information ring, wherein the TX packet information ring is included in the TCM. The CPU is further configured to perform a BD write back (BDW) operation including: the CPU reading the multiple pieces of TX BD data stored in the TX packet information ring and then writing the multiple pieces of TX BD data into a TX BD ring; and the CPU reading the multiple pieces of TX header data stored in the TX packet information ring and then writing the multiple pieces of TX header data into the packet buffer, wherein the TX BD ring is included in the system memory.

These and other objectives of the present invention will no doubt become obvious to those of ordinary skill in the art after reading the following detailed description of the preferred embodiments that are illustrated in the various figures and drawings.

DETAILED DESCRIPTION OF THE PREFERRED EMBODIMENTS

The present specification discloses a device for packet processing acceleration. Compared to the prior art, the device of the present disclosure has no need to use any cache memory and thus can prevent cache coherency and cache pollution problems. In addition, a central processing unit (CPU) in the device of the present disclosure has no need to access the read and write indices of a direct memory access (DMA) controller of any network interface controller and thus long latency problems can be prevented. In this specification, both the terms "A and/or B" and "at least one of A and B" denote "any or any combination of A and B"; and the term "ring" denotes "ring buffer".

Figure 1:
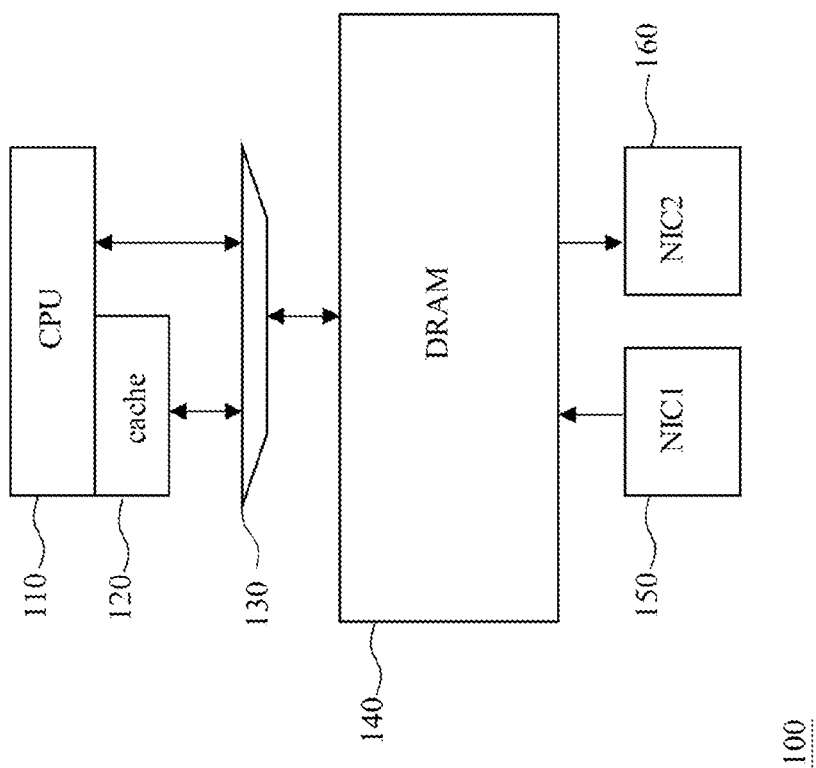
FIG. 1 shows a conventional packet processing device.
Figure 2:
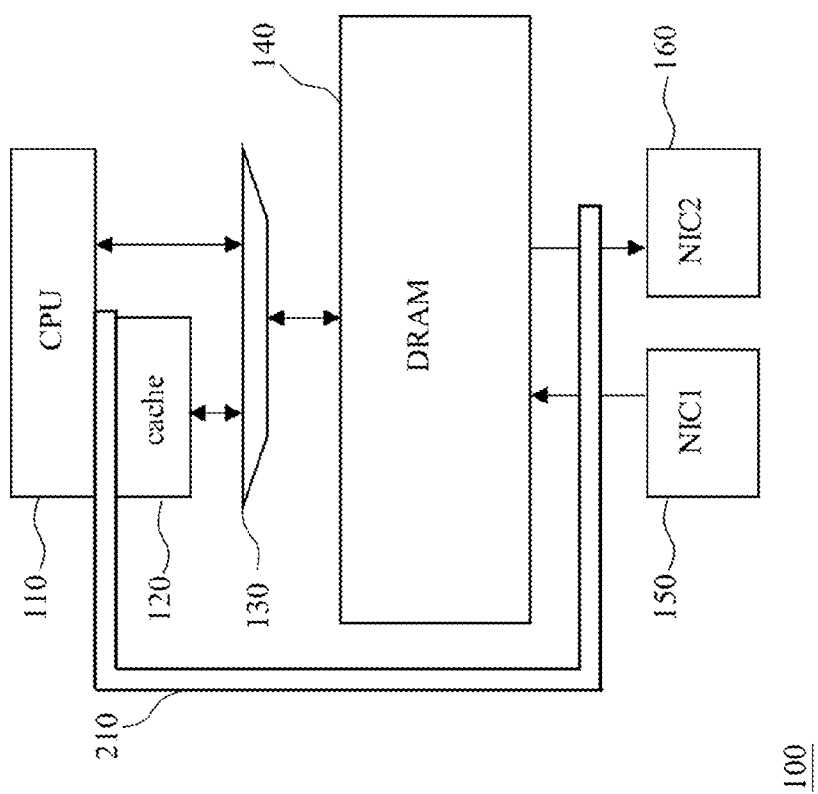
FIG. 2 shows another conventional packet processing device.
Figure 3:
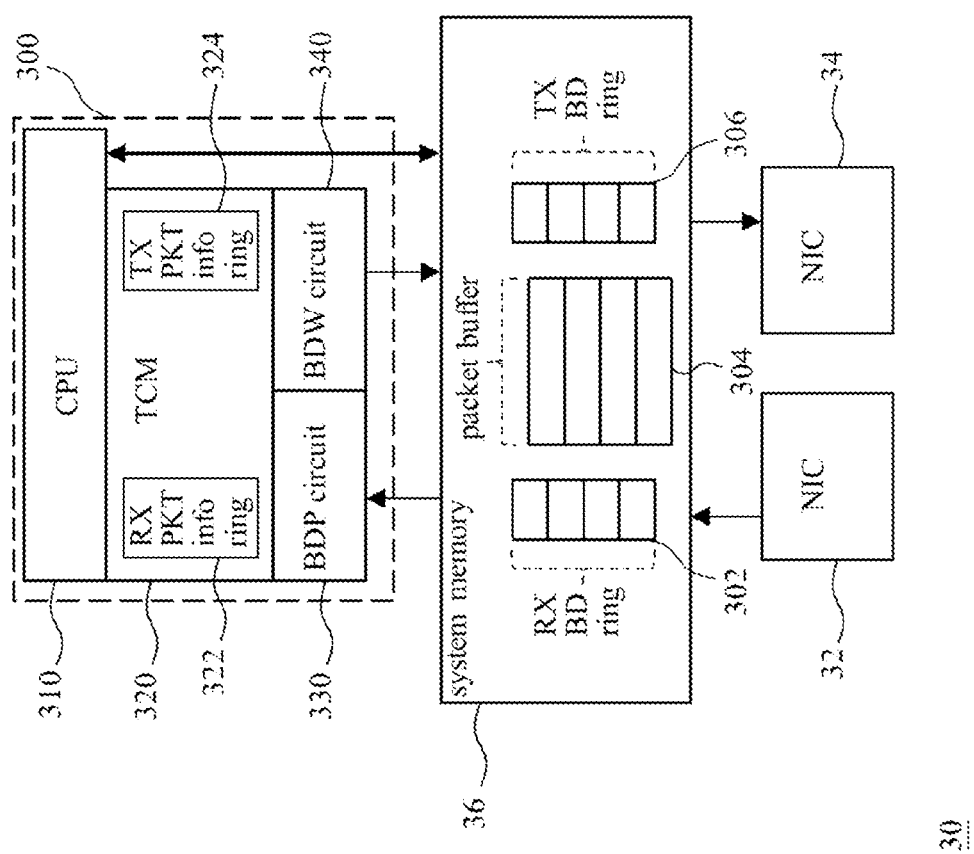
FIG. 3 shows an embodiment of the device for packet processing acceleration of the present disclosure.

FIG. 3 shows an embodiment of the device for packet processing acceleration of the present disclosure. The device 300 of FIG. 3 includes a central processing unit (CPU) 310, a tightly coupled memory (TCM) 320, a buffer descriptor (BD) prefetch circuit 330 (hereinafter referred to as "the BDP circuit 330"), and a BD write back circuit 340 (hereinafter referred to as "the BDW circuit 340"). These circuits are described in the later paragraphs.

FIG. 3 also shows an exemplary application of the device 300. In this application, the device 300 is included in a packet forwarding device 30 (e.g., home gateway, WiFi access point, or 5G base station). The packet forwarding device 30 also includes a first network interface controller 32 (hereinafter referred to as "the NIC 32") (e.g., Ethernet interface controller), a second network interface controller 34 (hereinafter referred to as "the NIC 34) (e.g., wireless network interface controller), and a system memory 36 (e.g., dynamic static access memory, DRAM).

In regard to the embodiment of FIG. 3, the TCM 320 is coupled to the CPU 310, the BDP circuit 330, and the BDW circuit 340. In an exemplary implementation, the TCM 320 is a static random access memory (SRAM). In an exemplary implementation, the TCM is coupled with the CPU 310 directly without any intervening circuit so that the CPU 310 can access the TCM 320 rapidly. In an exemplary implementation, the TCM 320 does not include any cache controller and thus is different from a cache (e.g., a cache dedicated to the CPU 310).

In regard to the embodiment of FIG. 3, the BDP circuit 330 is configured to read multiple pieces of reception-end (RX) BD data stored in an RX BD ring 302 according to a BD extraction map and then write the multiple pieces of RX BD data into an RX packet information ring (RX PKT info ring) 322. The RX BD ring 302 is included in the system memory 36 and configured to serve an RX DMA controller (not shown in FIG. 3) of the NIC 32. The RX packet information ring 322 is included in the TCM 320. The BD extraction map is a BD extraction basis determined according to the demand for implementation and/or utilization, and the way to determine the BD extraction map falls beyond the scope of the present disclosure because the present disclosure puts emphasis on the circuit configuration for data access. In an exemplary implementation, the multiple pieces of RX BD data include buffer information (e.g., buffer address and buffer length), and the BDP circuit 330 can obtain the buffer address of at least one RX packet according to the multiple pieces of RX BD data and then read the data of the at least one RX packet from the system memory 36 according to the buffer address. In an exemplary implementation, each of the RX BD ring 302 and the RX packet information ring 322 is a storage component array having a fixed/adjustable length.

In regard to the embodiment of FIG. 3, the BDP circuit 330 is further configured to read multiple pieces of RX header data stored in a packet buffer 304 according to a buffer extraction map and then write the multiple pieces of RX header data into the RX packet information ring 322. The packet buffer 304 is included in the system memory 36. The buffer extraction map is a buffer data extraction basis determined according to the demand for implementation and/or utilization, and the way to determine the buffer extraction map falls beyond the scope of the present disclosure.

In regard to the embodiment of FIG. 3, the CPU 310 is configured to access the RX packet information ring 322 to read and process the multiple pieces of RX BD data and the multiple pieces of RX header data and thereby generate multiple pieces of transmission-end (TX) BD data and multiple pieces of TX header data. The CPU 310 is further configured to write the multiple pieces of TX BD data and the multiple pieces of TX header data into a TX packet information ring (TX PKT info ring) 324 which is included in the TCM 320. The CPU 310 processes the multiple pieces of RX BD data and the multiple pieces of RX header data according to the demand for implementation and/or application, and this can be realized with known/self-developed technologies and falls beyond the scope of the present disclosure. It is noted that the CPU 310 accesses the TCM 320 without accessing the RX BD ring 302, the packet buffer 304, and the below-mentioned TX BD ring 306 under the circuit configuration of the present disclosure and therefore reduces access latency. It is also noted that the CPU 310 can access the system memory 36, if necessary.

In regard to the embodiment of FIG. 3, the BDW circuit 340 is configured to read the multiple pieces of TX BD data stored in the TX packet information ring 324 and then write the multiple pieces of TX BD data into a TX BD ring 306. The TX BD ring 306 is included in the system memory 36 and configured to serve a TX DMA controller (not shown in FIG. 3) of the NIC 34. The BDW circuit 340 is further configured to read the multiple pieces of TX header data stored in the TX packet information ring 324 and then write the multiple pieces of TX header data into the packet buffer 304. In an exemplary implementation, the multiple pieces of TX BD data include buffer information (e.g., buffer address and buffer length), and the BDW circuit 340 can obtain the buffer address of at least one TX packet according to the multiple pieces of TX BD data and then use the multiple pieces of TX header data to update the data of the at least one TX packet according to the buffer address.

Figure 4:
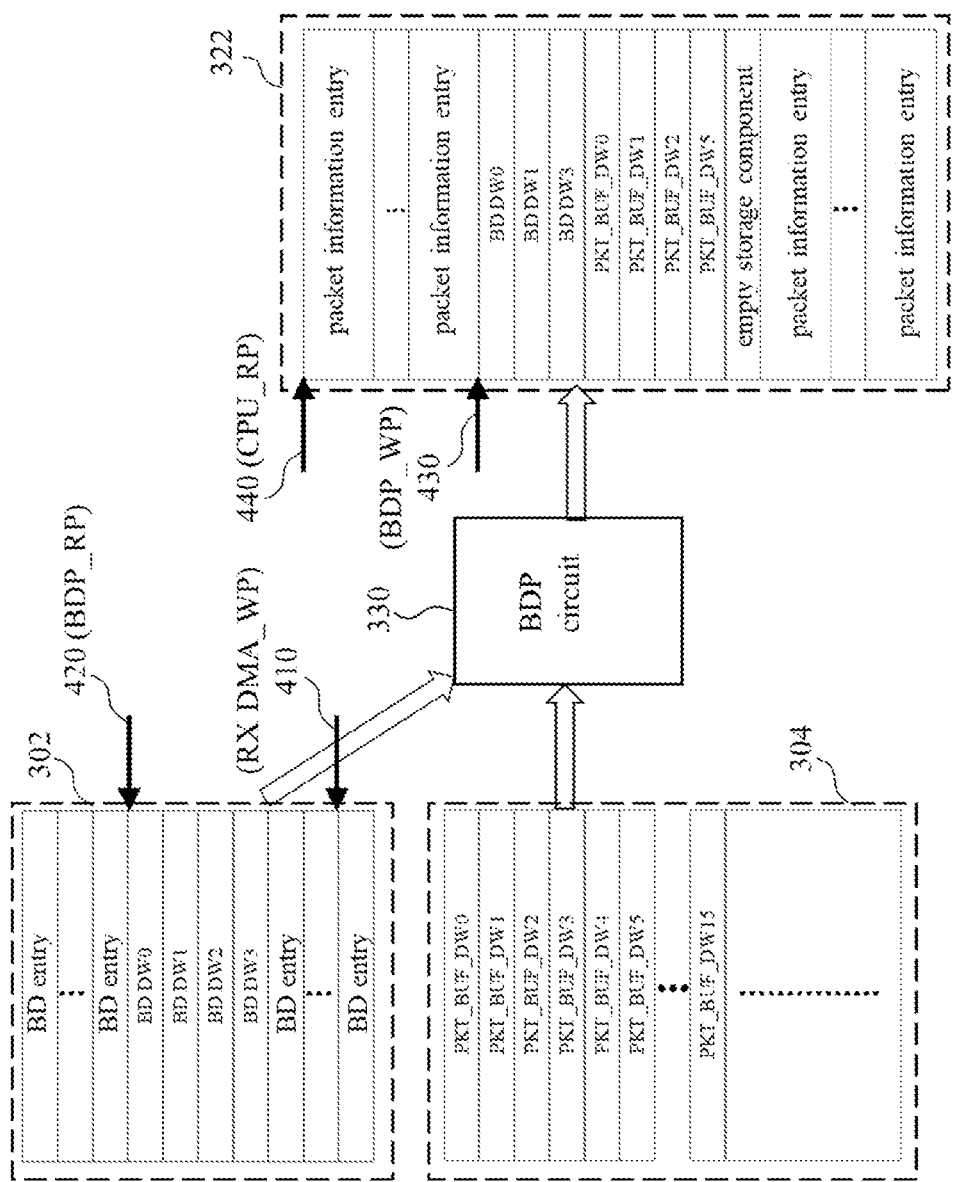
FIG. 4 shows an embodiment of the buffer descriptor prefetch (BDP) circuit of FIG. 3 accessing the reception-end (RX) buffer descriptor (BD) ring, the packet buffer, and the RX packet information ring.

FIG. 4 shows an embodiment of the BDP circuit 330 of FIG. 3 accessing the RX BD ring 302, the packet buffer 304, and the RX packet information ring 322. As shown in FIG. 4, the BDP circuit 330 determines whether any BD data are waiting to be read according to a difference between an RX DMA write pointer (RX DMA_WP) 410 and a BDP read pointer (BDP_RP) 420 of the RX BD ring 302, and if there are BD data (i.e., the aforementioned multiple pieces of RX BD data) waiting to be read, the BDP circuit 330 selects and reads the multiple pieces of RX BD data (i.e., BD DW0, BD DW1, and BD DW3 in FIG. 4) from the BD data (i.e., BD DW0, BD DW1, BD DW2, and BD DW3 of FIG. 4) of the RX BD ring 302 according to the aforementioned BD extraction map. The BDP circuit 330 learns the buffer address of at least a packet of the multiple pieces of RX header data according to the multiple pieces of RX BD data, and selects and reads the multiple pieces of RX header data (i.e., PKT_BUF_DW0, PKT_BUF_DW1, PKT_BUF_DW2, and PKT_BUF_DW5) from the header data (i.e., PKT_BUF_DW0, PKT_BUF_DW1, PKT_BUF_DW2, PKT_BUF_DW3, PKT_BUF_DW4, PKT_BUF_DW5, . . . , and PKT_BUF_DW15) of the packet buffer 304 according to the buffer address and the aforementioned buffer extraction map. In addition, the BDP circuit 330 writes the multiple pieces of RX BD data and the multiple pieces of RX header data into the RX packet information ring 322 according to a BDP write pointer (BDP_WP) 430. The RX DMA write pointer 410 is controlled by the RX DMA controller of the NIC 32; and both the BDP read pointer 420 and the BDP write pointer 430 are controlled by the BDP circuit 330. It is noted that each unit of the RX BD ring 302/packet buffer 304/RX packet information ring 322 in FIG. 4 is a storage component whose size is determined according to the demand for implementation, and each storage component is storing data (e.g., BD entry or packet information entry) or is empty.

Figure 5:
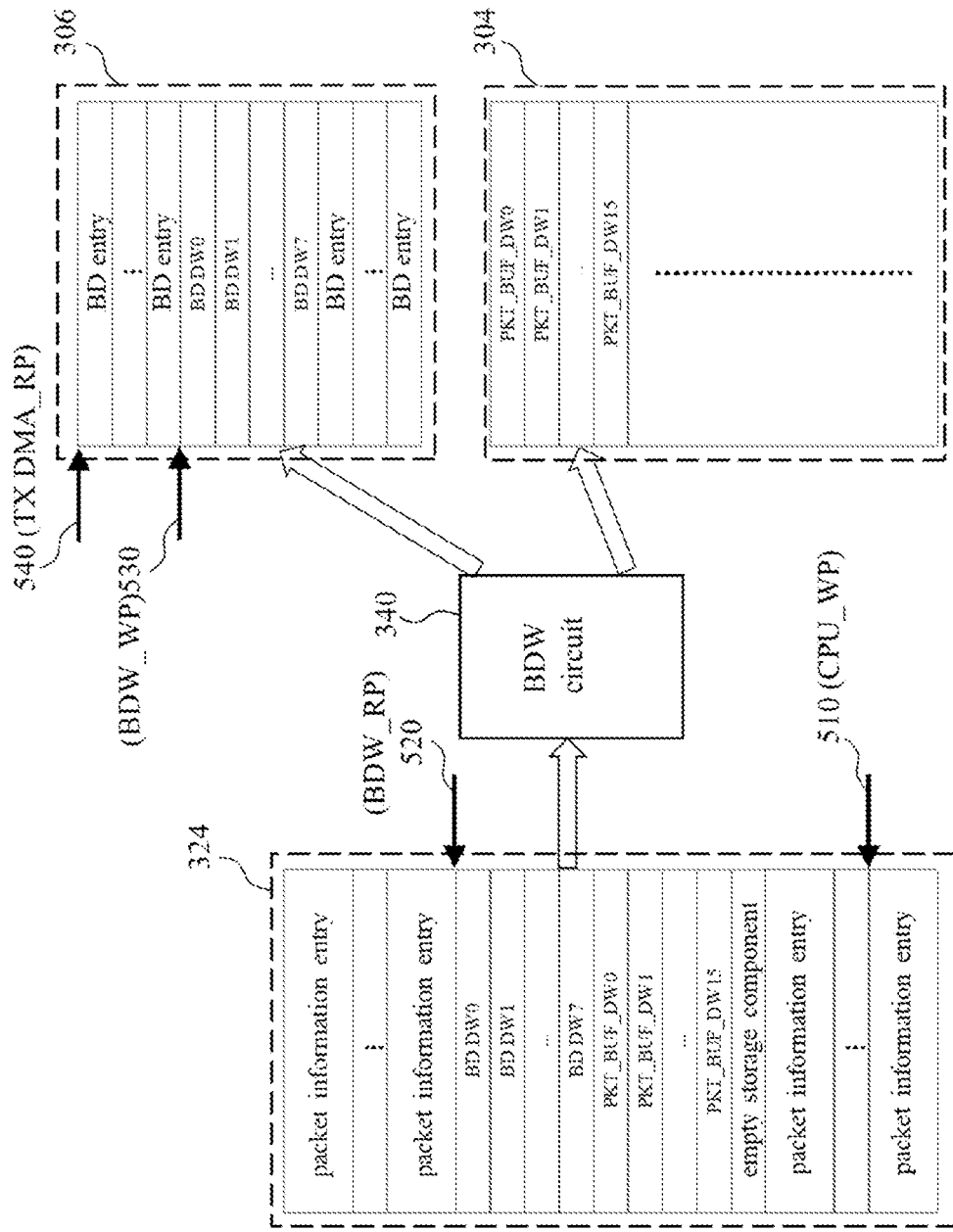
FIG. 5 shows an embodiment of the BD write back (BDW) circuit of FIG. 3 accessing the transmission-end (TX) packet information ring, the TX BD ring, and the packet buffer.

In regard to the embodiments of FIGS. 3-4, the CPU 310 determines whether any data are waiting to be read according to a difference between a BDP write pointer 430 of the RX packet information ring 322 and a CPU read pointer (CPU_RP) 440, and if there are data (i.e., the aforementioned multiple pieces of RX BD data and the multiple pieces of RX header data) to be read, the CPU 310 reads the multiple pieces of RX BD data and the multiple pieces of RX header data from the RX packet information ring 322. FIG. 5 shows an embodiment of the BDW circuit 340 of FIG. 3 accessing the TX packet information ring 324, the TX BD ring 306, and the packet buffer 304, wherein the CPU 310 writes the multiple pieces of TX BD data and the multiple pieces of TX header data into the TX packet information ring 324 according to a CPU write pointer (CPU_WP) 510, and both the CPU read pointer 440 and the CPU write pointer 510 are controlled by the CPU 310.

In regard to the embodiments of FIGS. 3 and 5, the BDW circuit 340 determines whether any data are waiting to be read according to a difference between the CPU write pointer 510 and a BDW read pointer (BDW_RP) 520 of the TX packet information ring 324, and if there are data (i.e., the aforementioned multiple pieces of TX BD data and multiple pieces of TX header data) waiting to be read, the BDW circuit 340 reads the multiple pieces of TX BD data (i.e., BD DW0, BD DW1, . . . , and BD DW7 in FIG. 5) and the multiple pieces of TX header data (i.e., PKT_BUF_DW0, PKT_BUF_DW1, . . . , and PKT_BUF_DW15 in FIG. 5) from the TX packet information ring 324. In addition, the BDW circuit 340 writes the multiple pieces of TX BD data into the TX BD ring 306 according to a BDW write pointer (BDW_WP) 530. Furthermore, the BDW circuit 340 learns the buffer address of at least one packet of the multiple pieces of TX header data according to the multiple pieces of TX BD data, and writes the multiple pieces of TX header data to the packet buffer 304 according to the buffer address and thereby updates the at least one packet. The TX DMA controller of the NIC 34 reads the at least one packet according to a TX DMA read pointer (TX DMA_RP) 540, but this falls beyond the scope of the present disclosure. It is noted that each unit of the TX packet information ring 324/TX BD ring 306/packet buffer 304 in FIG. 5 is a storage component whose size is determined according to the demand for implementation, and each storage component is storing data (e.g., BD entry or packet information entry) or is empty.

Figure 6:
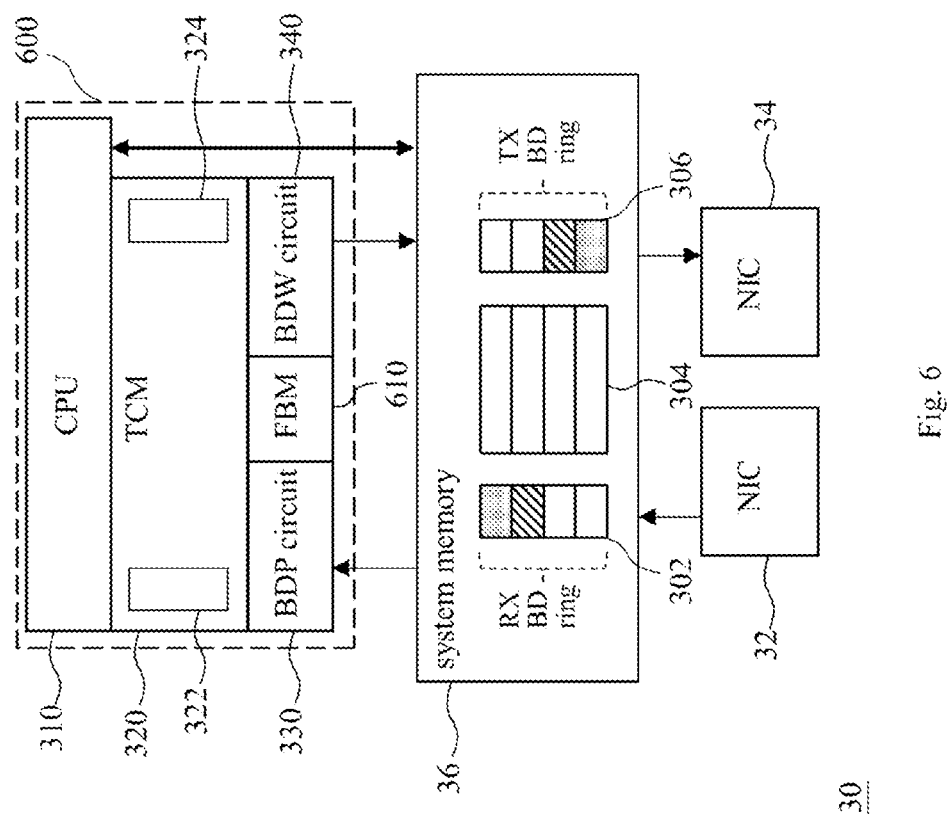
FIG. 6 shows another embodiment of the device for packet processing acceleration of the present disclosure.

FIG. 6 shows another embodiment of the device for packet processing acceleration of the present disclosure. Compared with the device 300 of FIG. 3, the device 600 of FIG. 6 further includes a free buffer manager (FBM) 610. The FBM 610 is configured to recycle N buffer address(s) of N transmission-complete space(s) in the TX BD ring 306 through the BDP circuit 330, wherein the buffer data (i.e., the data stored in the N transmission-complete space(s)) in connection with the N buffer address(s) have been read by the TX DMA controller of the NIC 34, and the N is a positive integer. In detail, the TX BD ring 306 includes: the storage component(s) (i.e., the box(es) filled with slashes in the TX BD ring 306) waiting to be read by the TX DMA controller; the storage component(s) (i.e., the box(es) filled with dots in the TX BD ring 306) being read by the TX DMA controller already, wherein the buffer address(es) of this/these storage component(s) is/are not recycled yet; and the storage component(s) (the blank(s) in the TX BD ring 306) whose buffer address(es) is/are recycled by the FBM 610 through the BDP circuit 330 already. In an exemplary implementation, the FBM 610 can recycle a buffer address of an RX BD ring (e.g., the subsidiary RX BD ring 302-1 in FIG. 8) through the BDP circuit 330, and this RX BD ring serves the TX DMA controller of the NIC 34 here; since the detail of the above-mentioned operation can be derived from the preceding description, repeated description is omitted here. It is noted that the CPU 310 can request the BDP circuit 330 to perform the buffer address recycling operation according to the request from the DMA controller of the NIC 32/34. It is also noted that the recycling operation can be performed by the CPU 310 instead.

In regard to the embodiment of FIG. 6, the FBM 610 is also configured to refill M read-complete space(s) in the RX BD ring 302 with M buffer address(es) through the BDW circuit 340, wherein the buffer data (i.e., the data stored in the M read-complete space(s)) in connection with the M buffer address(es) have been read by the CPU 310, and the M is positive integers. In detail, the RX BD ring 302 includes: the storage component(s) (i.e., the box(es) filled with slashes in the RX BD ring 302 of FIG. 6) waiting to be read by the BDP circuit 330; the storage component(s) (i.e., the box(es) filled with dots in the RX BD ring 302 of FIG. 6) being read by the BDP circuit 330 already, wherein this/these storage component(s) is/are not refilled with buffer address(es) yet; and the storage component(s) (the blank(s) in the RX BD ring 302) that has/have been refilled with buffer address(es) by the FBM 610 through the BDW circuit 340 already. In an exemplary implementation, the FBM 610 can refill a TX BD ring (e.g., the subsidiary TX BD ring 306-1 in FIG. 8) with a buffer address through the BDW circuit 340, and this TX BD ring serves the RX DMA controller of the NIC 32 here; since the detail of the above-mentioned operation can be derived from the preceding description, repeated description is omitted here. It is noted that the CPU 310 can request the BDW circuit 340 to perform the buffer address refilling operation according to the request from the DMA controller of the NIC 32/34. It is also noted that the refilling operation can be performed by the CPU 310 instead.

Figure 7:
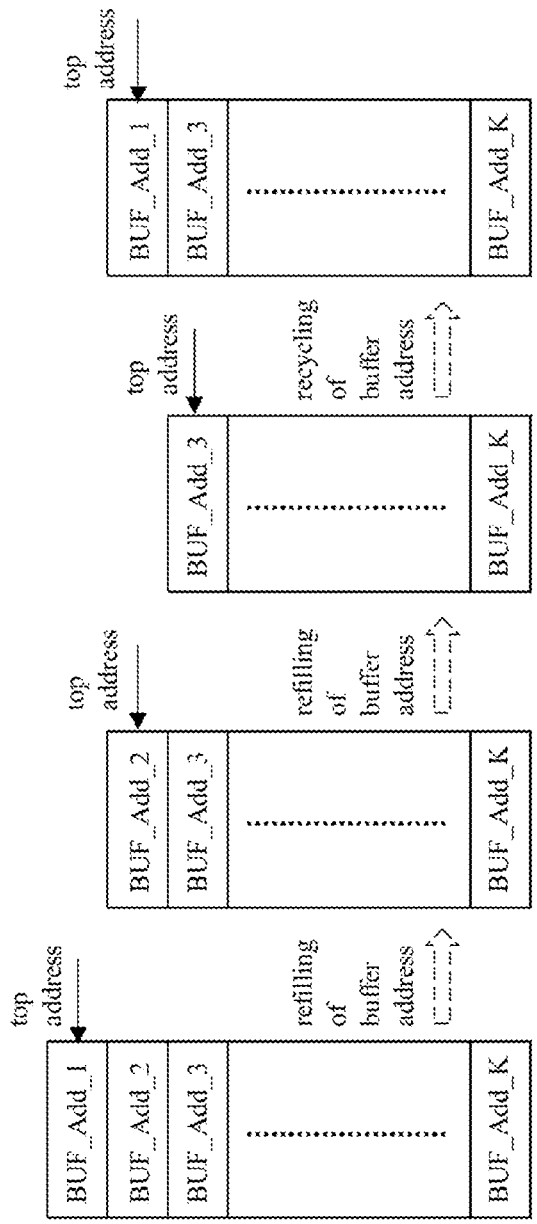
FIG. 7 shows an embodiment of how the free buffer manager (FBM) of FIG. 6 manages buffer addresses.

FIG. 7 shows an embodiment of how the FBM 610 of FIG. 6 manages buffer addresses. As shown in FIG. 7, the FBM 610 treats K buffer addresses (i.e., BUF_Add_1, BUF_Add_2, BUF_Add_3, . . . , and BUF_Add_K in FIG. 7) as a stack of buffer addresses, and the K is an integer greater than one. When the FBM 610 is going to refill a read-complete space in the RX BD ring 302 with a buffer address, the FBM 610 uses the top address of the stack of buffer address as the buffer address. When the FBM 610 recycles a transmission-complete address of a transmission-complete space in the TX BD ring 306, the FBM 610 treats the transmission-complete address as the top address of the stack of buffer address.

Figure 8:
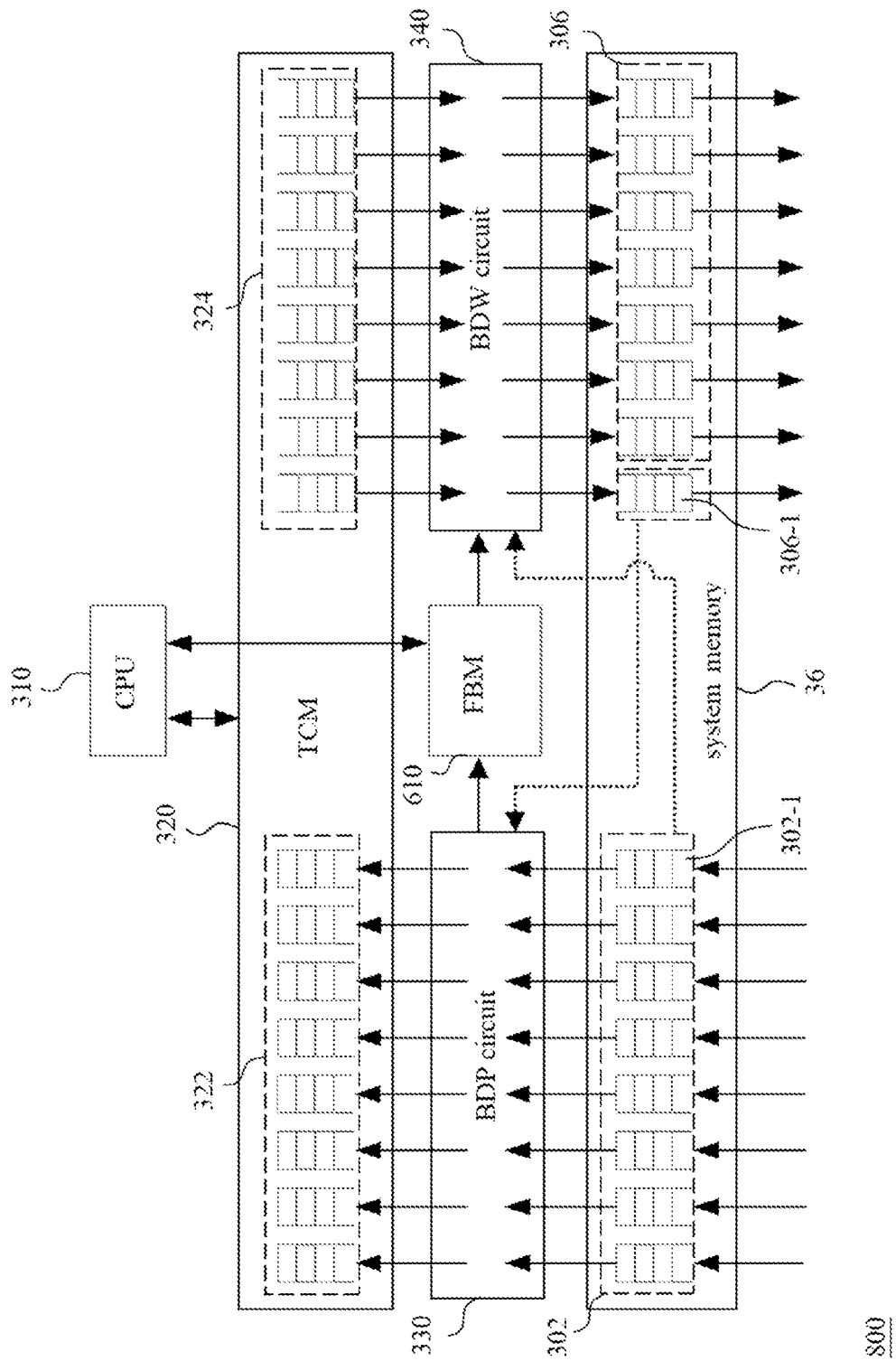
FIG. 8 shows a multi-channel embodiment of the device for packet processing acceleration of the present disclosure.

FIG. 8 shows a multi-channel embodiment of the device for packet processing acceleration of the present disclosure. In regard to the device 800 of FIG. 8, the BDP circuit 330 supports eight BDP channels, each of which cooperates with an subsidiary RX BD ring of the RB BD ring 302 and a subsidiary TX packet information ring of the TX packet information ring 322, wherein some or all of the subsidiary RX BD rings is/are controlled by an RX DMA controller (not shown in FIG. 8) and also controlled by the FBM 610 through the BDW circuit 340 as illustrated with the dashed arrow to the BDW circuit 340 in FIG. 8. In addition, the BDW circuit 340 supports eight BDW channels, each of which is in connection with a subsidiary TX BD ring of the TX BD ring 306 and a subsidiary TX packet information ring of the TX packet information ring 324, wherein some or all of the subsidiary TX BD rings is/are controlled by a TX DMA controller (not shown in FIG. 8) and also controlled by the FBM 610 through the BDP circuit 330 as illustrated with the dashed arrow to the BDP circuit 330 in FIG. 8. Since those having ordinary skill in the art can refer to the embodiments of FIGS. 3-7 to appreciate the detail and modification of the embodiment of FIG. 8, repeated and redundant description is omitted here.

In an embodiment, the CPU 310 of FIG. 3 executes a program to realize the functions of the BDP circuit 330 and BDW circuit 340 of FIG. 3. In an embodiment, the CPU 310 of FIG. 6 executes a program to realize the functions of the BDP circuit 330, BDW circuit 340, and FBM 610 of FIG. 6. In an embodiment, the CPU 310 is a multi-core processor, which means that the CPU 310 includes two or more independent central processing cores which can execute programs and/or instructions respectively to realize a multitasking operation and thereby accelerate the execution of the programs and/or instructions with parallel computing. To be more specific, the CPU 310 performs at least one of the aforementioned BDP operation, the BD processing operation, the BDW operation, the recycling operation, and the refilling operation in a multitasking manner. In an embodiment, the function(s) of at least a part of the BDP circuit 330, the BDW circuit 340, and the FBM 610 is realized with an independent central processing core. Since those having ordinary skill in the art can refer to the embodiments of FIGS. 3-8 and common technologies to appreciate the detail and modification of the above embodiments, repeated and redundant description is omitted here.

It should be noted that people having ordinary skill in the art can selectively use some or all of the features of any embodiment in this specification or selectively use some or all of the features of multiple embodiments in this specification to implement the present invention as long as such implementation is practicable; in other words, the implementation of the present invention can be flexible based on the present disclosure.

To sum up, the device for packet processing acceleration of the present disclosure can prevent cache coherency and cache pollution problems, and can also prevent long latency problems.

The aforementioned descriptions represent merely the preferred embodiments of the present invention, without any intention to limit the scope of the present invention thereto. Various equivalent changes, alterations, or modifications based on the claims of the present invention are all consequently viewed as being embraced by the scope of the present invention.

What is claimed is:
1. A device for packet processing acceleration comprising a central processing unit (CPU), a tightly coupled memory (TCM), a buffer descriptor (BD) prefetch circuit, and a BD write back circuit, wherein:
   the TCM is coupled to the CPU;
   the BD prefetch (BDP) circuit is coupled to the TCM, and configured to read multiple pieces of reception-end (RX) BD data stored in an RX BD ring according to a BD extraction map and then write the multiple pieces of RX BD data into an RX packet information ring; and the BDP circuit is further configured to read multiple pieces of RX header data stored in a packet buffer according to a buffer extraction map, and then write the multiple pieces of RX header data into the RX packet information ring, wherein both the RX BD ring and the packet buffer are included in a system memory and the RX packet information ring is included in the TCM;
   the CPU is configured to access the RX packet information ring to read and process the multiple pieces of RX BD data and the multiple pieces of RX header data and thereby generate multiple pieces of transmission-end (TX) BD data and multiple pieces of TX header data; and the CPU is further configured to write the multiple pieces of TX BD data and the multiple pieces of TX header data into a TX packet information ring, wherein the TX packet information ring is included in the TCM; and the BD write back (BDW) circuit is coupled to the TCM, and configured to read the multiple pieces of TX BD data stored in the TX packet information ring and then write the multiple pieces of TX BD data into a TX BD ring; and the BDW circuit is further configured to read the multiple pieces of TX header data stored in the TX packet information ring and then write the multiple pieces of TX header data into the packet buffer, wherein the TX BD ring is included in the system memory.

2. The device of claim 1, wherein the CPU do not access the RX BD ring and the TX BD ring.

3. The device of claim 1, wherein the BDP circuit determines whether to read the multiple pieces of RX BD data from the RX BD ring according to a difference between an RX direct memory access (RX DMA) write pointer and a BDP read pointer of the RX BD ring; the BDP circuit learns at least one buffer address of at least a packet of the multiple pieces of RX header data according to the multiple pieces of RX BD data, and accordingly read the multiple pieces of RX header data from the packet buffer; the BDP circuit writes the multiple pieces of RX BD data and the multiple pieces of RX header data into the RX packet information ring according to a BDP write pointer; the RX DMA write pointer is controlled by an RX DMA controller; and both the BDP read pointer and the BDP write pointer are controlled by the BDP circuit.

4. The device of claim 1, wherein the CPU determines whether to read the multiple pieces of RX BD data and the multiple pieces of RX header data from the RX packet information ring according to a difference between a BDP write pointer and a CPU read pointer of the RX packet information ring; the CPU writes the multiple pieces of TX BD data and the multiple pieces of TX header data into the TX packet information ring according to a CPU write pointer; the BDP write pointer is controlled by the BDP circuit; and both the CPU read pointer and the CPU write pointer are controlled by the CPU.

5. The device of claim 1, wherein the BDW circuit determines whether to read the multiple pieces of TX BD data and the multiple pieces of TX header data according to a difference between a CPU write pointer and a BDW read pointer of the TX packet information ring; the BDW circuit writes the multiple pieces of TX BD data into the TX BD ring according to a BDW write pointer; and the BDW circuit learns at least a buffer address of at least a packet of the multiple pieces of TX header data according to the multiple pieces of TX BD data, and accordingly writes the multiple pieces of TX header data into the packet buffer.

6. The device of claim 1, further comprising a free buffer manager (FBM) configured to recycle N buffer address(es) of N transmission-complete space(s) in the TX BD ring through the BDP circuit, and further configured to refill M read-complete space(s) in the RX BD ring with M buffer address(es) through the BDW circuit, wherein both the N and the M are positive integers.

7. The device of claim 6, wherein the FBM treats K buffer addresses as a stack of buffer addresses, and the K is an integer greater than one; when the FBM is going to refill a first read-complete space in the RX BD ring with a first buffer address, the FBM uses a top address of the stack of buffer address as the first buffer address; and when the FBM recycles a first transmission-complete address of a first transmission-complete space in the TX BD ring, the FBM treats the first transmission-complete address as the top address of the stack of buffer address.

8. The device of claim 1, wherein both the device and the system memory are included in a packet forwarding apparatus, the RX BD ring is configured to serve a first network interface controller of the packet forwarding apparatus, and the TX BD ring is configured to serve a second network interface controller of the packet forwarding apparatus.

9. The device of claim 1, wherein the TCM is a static random access memory (SRAM) and the system memory is a dynamic random access memory (DRAM).

10. A device for packet processing acceleration comprising a central processing unit (CPU) and a tightly coupled memory (TCM), wherein:

the TCM is coupled to the CPU;

the CPU is configured to perform a buffer descriptor prefetch (BDP) operation including: the CPU reading multiple pieces of reception-end (RX) buffer descriptor (BD) data stored in an RX BD ring according to a BD extraction map and then writing the multiple pieces of RX BD data into an RX packet information ring; and the CPU reading multiple pieces of RX header data stored in a packet buffer according to a buffer extraction map, and then writing the multiple pieces of RX header data into the RX packet information ring, wherein both the RX BD ring and the packet buffer are included in a system memory and the RX packet information ring is included in the TCM;

the CPU is configured to perform a BD processing operation including: the CPU accessing the RX packet information ring to read and process the multiple pieces of RX BD data and the multiple pieces of RX header data and thereby generating multiple pieces of transmission-end (TX) BD data and multiple pieces of TX header data; and the CPU writing the multiple pieces of TX BD data and the multiple pieces of TX header data into a TX packet information ring, wherein the TX packet information ring is included in the TCM; and the CPU is configured to perform a BD write back (BDW) operation including: the CPU reading the multiple pieces of TX BD data stored in the TX packet information ring and then writing the multiple pieces of TX BD data into a TX BD ring; and the CPU reading the multiple pieces of TX header data stored in the TX packet information ring and then writing the multiple pieces of TX header data into the packet buffer, wherein the TX BD ring is included in the system memory.

11. The device of claim 10, wherein the CPU is configured to perform a recycling operation to recycle N buffer address(es) of N transmission-complete space(s) in the TX BD ring, and further configured to perform a refilling operation to refill M read-complete space(s) in the RX BD ring with M buffer address(es), in which both the N and the M are positive integers.

12. The device of claim 11, wherein the CPU is a multi-core processor configured to perform at least one of the BDP operation, the BD processing operation, the BDW operation, the recycling operation, and the refilling operation in a multitasking manner.

13. The device of claim 11, wherein the CPU treats K buffer addresses as a stack of buffer addresses, and the K is an integer greater than one; when the CPU is going to refill a first read-complete space in the RX BD ring with a first buffer address, the CPU uses a top address of the stack of buffer address as the first buffer address; and when the CPU recycles a first transmission-complete address of a first transmission-complete space in the TX BD ring, the CPU treats the first transmission-complete address as the top address of the stack of buffer address.

14. The device of claim 10, wherein both the device and the system memory are included in a packet forwarding apparatus, the RX BD ring is configured to serve a first network interface controller of the packet forwarding apparatus, and the TX BD ring is configured to serve a second network interface controller of the packet forwarding apparatus.

15. The device of claim 10, wherein the TCM is a static random access memory (SRAM) and the system memory is a dynamic random access memory (DRAM).

* * * * *